United States Patent Office 3,011,946
Patented Dec. 5, 1961

3,011,946
PARENTERALLY ADMINISTRABLE PREPARATIONS OF NYSTATIN
Elliot Bartner and John Yakubik, New Brunswick, N.J., assignors to Olin Mathieson Chemical Corporation, New York, N.Y., a corporation of Virginia
No Drawing. Filed Feb. 15, 1955, Ser. No. 488,395
11 Claims. (Cl. 167—65)

This invention relates to parenterally-administrable preparations of nystatin (fungicidin), the term "parenterally-administrable" being employed herein as comprehending preparations requiring reconstitution for parenteral administration.

The parenterally-administrable solutions of nystatin heretofore available have been unsatisfactory for various reasons, inter alia, their low concentration or instability. The solubility of nystatin in water and in 4% benzyl alcohol being less than 3,000 units per ml., attempts have been made to increase this solubility by use of a water-soluble salt of nystatin, such as nystatin hydrochloride, in parenteral formulations, but these solutions proved to be unstable with total loss of nystatin activity after short periods of time.

One object of this invention is the provision of a stable high-concentration parenterally-administrable solution of nystatin. Another object of this invention is the provision of a substantially dry composition suitable for the preparation of said stable high-concentration parenterally-administrable solution of nystatin.

These objects are achieved by the practice of this invention, which is based on the unexpected discovery that nystatin is highly soluble in an aqueous solution of a soluble saccharin. It has further been found that the incorporation of benzyl alcohol into the solution imparts even greater solubility to the nystatin, so that the addition of benzyl alcohol to the aqueous solution of nystatin and soluble saccharin, although not necessary, is a desirable and preferred modification of this invention. It has further been found that such solutions of nystatin and soluble saccharin in water can be lyophilized to yield a dry solid composition, which can subsequently be reconstituted to give the aqueous parenterally-administrable solution.

The compositions of this invention, therefore, are: (I) an aqueous solution of nystatin which comprises water, nystatin, and as a solubilizing agent, a soluble saccharin and preferably also benzyl alcohol; and (II) a dry mixture of nystatin and a soluble saccharin.

Suitable soluble saccharins (by the term "soluble saccharin" is meant a form of saccharin more soluble in water than saccharin itself, i.e. a saccharin derivative having a solubility materially greater than 0.43 g. per 100 ml. of water at 25° C.) are exemplified by the alkali metal salts of saccharin (e.g. the potassium and, preferably, the sodium salts of saccharin), ammonium saccharin, and the water-soluble pharmacodynamically-acceptable amine salts of saccharin. In the aqueous solution form of the compositions of this invention, these soluble saccharins, either alone or in combination, are present in concentrations of about 10% to about 70% (preferably about 25% to about 60%) in the final aqueous parenterally-administrable solution, that is to say from about 10 g. to about 70 g. of soluble saccharin is present per 100 ml. of solution. When benzyl alcohol is used as an additional solubilizing agent (the benzyl alcohol also serves as a preservative and local anesthetic), it is preferably present in the final aqueous solution in a concentration of about 4%. The concentration of nystatin in the final composition can vary, depending on the condition to be treated, the number of daily doses, the size of each dose, etc. Preferably, however, the nystatin in the aqueous solution form is present in a concentration materially greater than its solubility in water alone (about 3,000 units per ml. of solution), up to the maximum solubility of the nystatin in the particular solvent composition employed. (For a definition of a unit of nystatin, see the article by Gold et al. entitled "Assay Methods for Nystatin," in Antibiotics Annual 1953–1954, pages 195–198.)

The following examples illustrate suitable methods for preparing the aqueous solution form of the compositions of this invention (in these examples, the nystatin used is that obtained by the process disclosed in the U.S. patent application of Dutcher et al., Serial No. 480,278, filed January 6, 1955, now U.S. Patent No. 2,865,807.

EXAMPLE 1

60 g. of sodium saccharin is dissolved in approximately 55 ml. of distilled water. The solution is heated to about 50° C. until solution is complete. The solution is then cooled and sufficient water is added to bring the volume to exactly 100 ml. 2.0 g. of nystatin (assaying at 3000 u./mg.) is added and the mixture is slurried at room temperature until solution is complete.

EXAMPLE 2

60 g. of sodium saccharin is dissolved in about 55 ml. of distilled water. The mixture is heated to a temperature of about 50° C. to speed solution. While the solution is still warm, 4 gms. of benzyl alcohol is added. The solution is then cooled and sufficient distilled water is added to bring the volume of the solution to 100 ml. 3.9 g. of pure nystatin (assaying at 3000 u./ml.) is added to the solution and the mixture is slurried at room temperature for 30 minutes.

By means of processes analogous to those of Examples 1 and 2, compositions containing a final concentration of 10%, 25%, and 50% sodium saccharin without benzyl alcohol and with 4% benzyl alcohol are prepared. Also, other soluble saccharins, such as potassium saccharin, can be substituted for the sodium saccharin in the above examples. By varying the amount of nystatin employed in these examples, the potency of the resulting aqueous solutions can correspondingly be altered.

The solubilizing effect of soluble saccharin with or without benzyl alcohol is evident from the results summarized in Table I:

Table I

| Concentration of Sodium Saccharin | Maximum Concentration of Nystatin in units/ml. | |
|---|---|---|
| | Without Benzyl Alcohol | With Benzyl Alcohol 4% |
| None (0%) | <3,000 | <3,000 |
| 10% | 4,250 | 32,610 |
| 25% | 17,720 | 70,280 |
| 50% | 52,160 | 122,040 |
| 60% | 61,050 | 118,140 |

The above table further shows that maximum solubility of nystatin is obtained in a solution containing 50% sodium saccharin and 4% benzyl alcohol.

The stability of solutions of nystatin and soluble saccharin is illustrated by Table II, for which test a 60% sodium saccharin solution saturated with nystatin was sterilized by filtration, filled into ampules and placed on storage. The initial potency of the solution was 66,940 units/ml. and the pH of the solution was 5.93 (a pH in the range at which nystatin is most stable).

Table II

| Duration of Test in Days | Potency (units/ml.) | |
|---|---|---|
| | Refrigeration | Room Temperature |
| 1 | 70,990 | 66,260 |
| 3 | 73,330 | 61,940 |
| 7 | 68,520 | 36,110 |
| 15 | 60,800 | |

The solubility of solutions of nystatin, soluble saccharin and benzyl alcohol is illustrated by Table III, for which test a 40% sodium saccharin solution saturated with nystatin and containing 4% benzyl alcohol was sterilized, filled into ampules and placed on storage. The initial potency of the solution was 77,200 units/ml.

Table III

| Duration of Test in Days | Potency (units/ml.) | |
|---|---|---|
| | Refrigeration | Room Temperature |
| 7 | 77,000 | 46,100 |
| 14 | 68,100 | 42,300 |

For parenteral administration, the solutions are sterilized (as by suitable filtration) and filled into multiple-dose vials or single-dose ampules. The concentration of the nystatin and the dosage unit is adjusted so that each dose contains from about 50,000 to 300,000 units (preferably a 2 cc. dose containing 100,000 to 200,000 units of nystatin). These doses can then be injected intramuscularly or intravenously in the treatment of diseases caused by pathogenic fungi (e.g. coccidioidomycosis and cryptococcal infections).

The aqueous solutions of nystatin and soluble saccharin can further be employed to prepare dry mixtures utilizable in reconstituting said aqueous solutions. Thus, an aqueous solution of soluble saccharin and nystatin can be freeze-dried (lyophilized) to remove the water content thereof, to yield an amorphous powder of soluble saccharin and nystatin. Subsequently, the proper amount of sterile distilled water can be added to yield a parenterally-administrable aqueous solution of soluble saccharin and nystatin. The process of preparing these dry compositions is illustrated by the following example:

EXAMPLE 3

60 gms. of sodium saccharin is dissolved in 55 ml. of water for injection. The solution is heated to about 50° C. until solution is complete and then cooled. Sufficient water is added to bring the volume to exactly 100 ml. 2.0 gm. of nystatin (assaying at 3,000 u./mg.) is added, and the mixture is slurried at room temperature for 30 minutes until solution is complete. The mixture is sterile filtered and the sterile filtrate freeze-dried. The resulting dry product can then be reconstituted with water or 4% benzyl alcohol.

The aqueous solution form of the compositions of this invention (and the dry compositions utilizable in their preparation) can, if it is desirable, contain certain additional ingredients, as for example, sodium chloride or another salt to render the solution isotonic. Furthermore, other therapeutically active agents such as a procaine salt or hydrocortisone may be included.

The invention may be variously otherwise embodied within the scope of the appended claims.

We claim:

1. A parenterally-administrable preparation of nystatin which comprises nystatin and a soluble saccharin, said preparation being such that, when provided in the form of an aqueous solution, the nystatin is present in a concentration greater than 3,000 units per ml. of solution.

2. A parenterally-administrable preparation of nystatin which comprises nystatin, a soluble saccharin, and benzyl alcohol, said preparation being such that, when provided in the form of an aqueous solution, the nystatin is present in a concentration greater than 3,000 units per ml. of solution.

3. A parenterally-administrable solution of nystatin which comprises water, nystatin, and a soluble saccharin, the nystatin being present in a concentration greater than 3,000 units per ml. of solution.

4. A parenterally-administrable aqueous solution of nystatin which comprises water, nystatin, a soluble saccharin, and benzyl alcohol.

5. A substantially dry composition utilizable for the provision of a parenterally-administrable aqueous solution, which comprises nystatin and a soluble saccharin, the nystatin being present in a concentration greater than 3,000 units per ml. of solution, said composition being such that, when reconstituted with water, the nystatin is present in a concentration greater than 3,000 units per ml. of solution.

6. A parenterally-administrable aqueous solution of nystatin which comprises water, nystatin, and a solubilizing agent selected from the class consisting of alkali metal, ammonium, and water-soluble pharmacodynamically-acceptable amine salts of saccharin, the solution containing a substantially greater concentration of nystatin than 3,000 units per ml.

7. The solution of claim 6 which contains a substantial amount of benzyl alcohol.

8. A parenterally-administrable aqueous solution of nystatin which comprises water, nystatin, and the sodium salt of saccharin, the solution containing a substantially greater concentration of nystatin than 3,000 units per ml. and the concentration of saccharin being in the range of about 100 mg. to about 700 mg. per ml. of solution.

9. A parenterally-administrable aqueous solution of nystatin which comprises water, nystatin, the sodium salt of saccharin, and benzyl alcohol, the solution containing a substantially greater concentration of nystatin than 3,000 units per ml. and the concentration of saccharin being in the range of about 100 mg. to about 700 mg. per ml. of solution and of benzyl alcohol being approximately 4% of the solution.

10. A substantially dry composition utilizable in the preparation of a parenterally-administrable aqueous solution of nystatin, which comprises nystatin and a solubilizing agent selected from the class consisting of alkali metal, ammonium, and water-soluble pharmacodynamically-acceptable amine salts of saccharin, said composition being such that, when reconstituted with water, the nystatin is present in a concentration greater than 3,000 units per ml. of solution.

11. A substantially dry composition utilizable in the preparation of a parenterally-administrable aqueous solution of nystatin, which comprises nystatin and the sodium salt of saccharin, said composition being such that, when reconstituted with water, the nystatin is present in a concentration greater than 3,000 units per ml. of solution.

References Cited in the file of this patent

UNITED STATES PATENTS

| 343,803 | Fahlberg | June 15, 1886 |
| 2,538,645 | Hamilton | Jan. 16, 1951 |
| 2,686,145 | Klotz | Aug. 10, 1954 |

OTHER REFERENCES

Hazen: "Fungicidin . . .," Proc. Soc. Expt'l. Biol. and Med., January 1951, pp. 93–97.

Dutcher et al.: "Prepn. and Properties of Crystalline Fungicidin (Nystatin)." Antibiotics Annual 1953–1954, December 1953, pages 191–194.

UNITED STATES PATENT OFFICE
CERTIFICATE OF CORRECTION

Patent No. 3,011,946   December 5, 1961

Elliot Bartner et al.

It is hereby certified that error appears in the above numbered patent requiring correction and that the said Letters Patent should read as corrected below.

Column 4, line 14, after "alcohol" insert -- , the nystatin being present in a concentration greater than 3,000 units per ml. of solution --; line 18, beginning with "the nystatin being" strike out all to and including "ml. of solution" in line 22, same column and insert instead -- said composition being such that, when reconstituted with water, the nystatin is present in a concentration greater than 3,000 units per ml. of solution --.

Signed and sealed this 24th day of July 1962.

(SEAL)
Attest:

ERNEST W. SWIDER
Attesting Officer

DAVID L. LADD
Commissioner of Patents